J. WILKINSON, 2 Sheets—Sheet 1.

Assignor of one-half to W. S. WILKINSON.

Cooling Dairies.

No. 9,583. Reissued Feb. 22, 1881.

Witnesses.
Henry Orth
J. S. Barker

Inventor
John Wilkinson
per W. H. Doubleday
Atty.

N. PETERS, PHOTO-LITHOGRAPHER, WASHINGTON, D. C.

J. WILKINSON,
2 Sheets—Sheet 2.
Assignor of one-half to W. S. WILKINSON.
Cooling Dairies.
No. 9,583. Reissued Feb. 22, 1881.
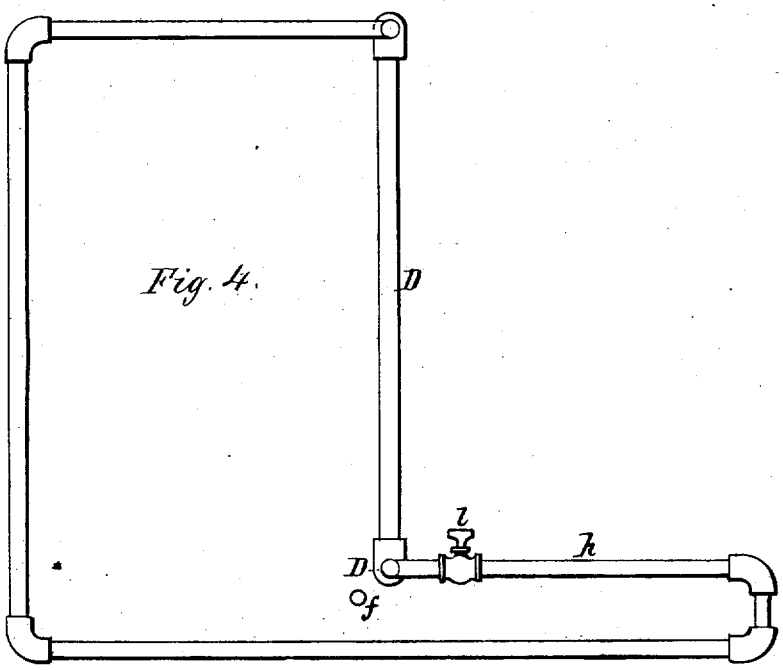
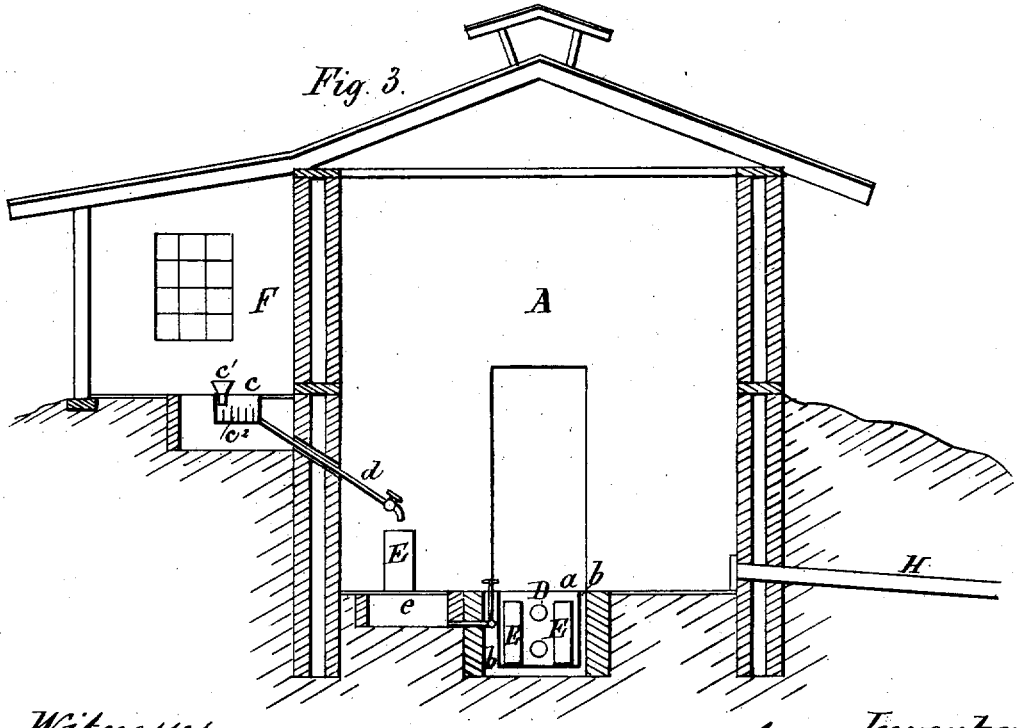
Witnesses.
Henry Orth
J. S. Barker
Inventor
John Wilkinson
Jno. H. H. Lambeday
Atty
N. PETERS, PHOTO-LITHOGRAPHER, WASHINGTON, D. C.

UNITED STATES PATENT OFFICE.

JOHN WILKINSON, OF HARVARD, ILLINOIS, ASSIGNOR OF ONE-HALF TO WALTER S. WILKINSON, OF BALTIMORE, MARYLAND.

COOLING DAIRIES.

SPECIFICATION forming part of Reissued Letters Patent No. 9,583, dated February 22, 1881.

Original No. 150,644, dated May 5, 1874. Application for reissue filed March 31, 1879.

*To all whom it may concern:*

Be it known that I, JOHN WILKINSON, of the village of Harvard, in the county of McHenry and State of Illinois, have invented certain new and useful Improvements in Ventilation; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

It is well known to all who are familiar with the subject that the earth at a depth of a few feet below its surface maintains a substantially uniform temperature throughout the entire year; and the object of one part of this invention is to utilize this uniformity of temperature in the ventilation of buildings.

To this end the first part of this invention relates to providing a building with an air-duct, which is constructed in the earth at a suitable distance below its surface, one end of said duct opening into the building or room at a point near the floor, the room or building being provided with suitable openings for the escape of rarefied air, whereby said duct serves to produce a continuous current of air through the building.

The second part of my invention relates to a dairy placed contiguously to an ice-house, and arranged in such manner that the milk and cream contained in the dairy shall be cooled by a current of water circulating automatically through an endless pipe from the ice-house to the dairy, and which current, after having absorbed a portion of the heat from the milk, is returned to the ice-house by being displaced by water of a lower temperature and greater density.

In the further description of my invention which follows, due reference must be had to the accompanying drawings, in which—

Figure 1:
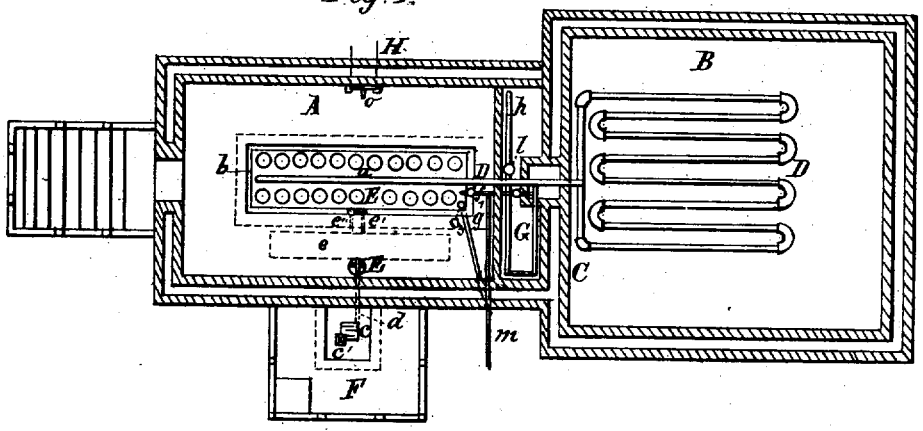
Figure 2:
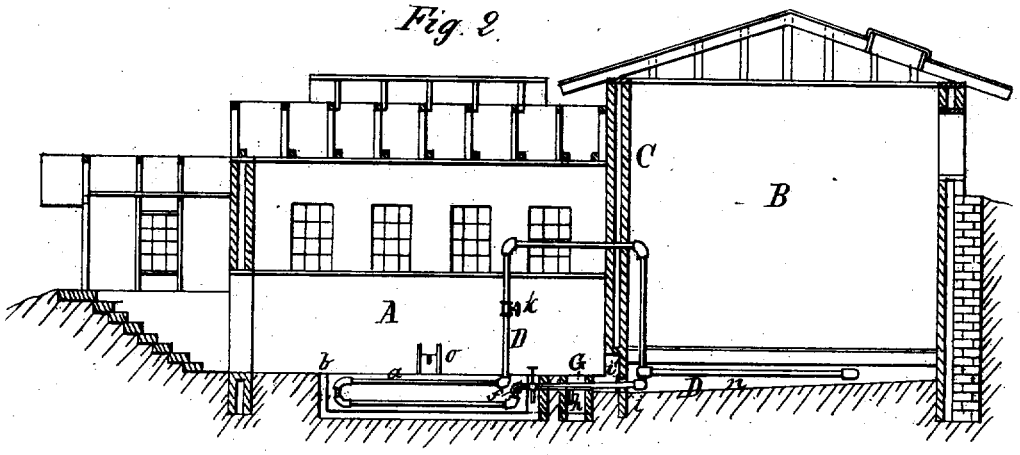

Figure 1 is a ground plan; Fig. 2, a longitudinal section; Fig. 3, a transverse section, and Fig. 4 a detached and enlarged view of a system of pipes hereinafter described.

Similar letters of reference indicate similar parts in all the views.

A represents the dairy-room, and B the ice-house, which are separated by the partition-wall C. To prevent absorption and radiation of heat, the walls of the structures are double, and form an air-space, which air-space is, by the introduction of horizontal or oblique diaphragms, divided into separate and distinct chambers or stories. The object of this isolation of chambers or stories is to prevent the circulation of the air contained therein by reason of solar influence on a portion of the walls.

D is an endless pipe, a portion of which occupies the ice-house, where it is formed into a gang, over which a floor is laid to support the ice. One portion of the pipe leads through the partition-wall C to a vat or water-bath, *a*, placed within a tank in the floor and supported upon legs. The water-bath *a* is surrounded by the air-space *b*, for the purpose of preventing absorption of heat. The pipe D enters the water-bath at one end, near the bottom, and extends nearly to the other end, when it returns and rises vertically before passing again through the partition into the ice-house.

It will be understood that as the temperature of the ice-house is much below that of the dairy and water-bath, an active circulation of the water in the pipe D must take place, impelled by the sinking of the coldest portion to the lowest point, and the displacement of the warmer.

E E are milk-cans, which, when filled, are placed in the water-bath to be cooled.

As it is important that the milk should be deprived of its animal heat rapidly, I construct an apartment, F, having a vat, *c*, with a pipe, *d*, leading therefrom to the dairy, for the purpose of filling the cans from without the dairy. The vat *c* is provided with a funnel, *c'*, through which the milk is poured. The bottom of the vat is formed with a series of vertical strips, *c''*, the said strips making a circuitous channel, in passing through which the milk is exposed to the air, and a larger quantity cooled before entering the cans, which are filled separately from the end of the pipe *d*. To assist in the cooling of the milk in this vat during hot weather, I construct the vat in such manner that ice, or ice and salt, can be applied to the outside. It is necessary to the proper cooling of the milk that the water in the water-bath should be kept at a uniform depth, and as the number of the milk-cans placed in the bath varies, I provide a reservoir, *e*, under the pavement, by the side of the bath, to receive any water displaced by the milk-cans, and from which to draw a supply when wanted. The reservoir is connected to the water-bath by the pipes *e′ e″*, the latter being the lower, and provided, as the supply-pipe, with a cock. The bottom of the reservoir is level with the surface of the water in the water-bath when not occupied with milk-cans.

G is a tank, to be used for storing butter and cream; or it may be used as an additional water-bath for milk, if necessary. This tank is partially cooled, under ordinary circumstances, by the pipe D passing through it; but the temperature can be further lowered by opening the cock *l*, which allows a circulation of water through the gang-pipe *h*.

The ground-floor of the ice-house is inclined toward the dairy, allowing the water produced by the melting of the ice to flow through the aperture *i* into a portion of the above-named tank, which is partitioned off and of a depth less than that of the other portion, and thence through the pipe *f* to the main water-bath. The aperture *i*, at the end leading into the partitioned-off part of the tank G, is covered by the strainer *i′*. In the pipe *f* is a cock, placed in the air-space *b*, which cock, when closed, causes the waste water to rise and pass into an overflow-pipe, *g′*, with which pipe the upright overflow-pipe *g* connects. In emptying the bath the upright pipe *g*, which fits by a ground joint into the bottom of the bath, is raised; but ordinarily the depth of the water in the bath is regulated by a flow over the top of this pipe. The water, having passed over the top of the pipe *g*, is carried thence away from the dairy through the waste-pipe *m*.

The temperature of the water-bath and milk can be regulated by the cock *k*, which controls the velocity of the current in pipe D. When the cock is entirely closed the circulation of water ceases, and the draft on the ice is discontinued.

H is a subterranean air-duct, leading from the center of the dairy, at a point a short distance above its floor, to a distance of some seventy or eighty feet, to a point at which air is admitted. The duct is slightly inclined, its outer end being the lowest. It is constructed at such depth that the temperature of the earth is substantially uniform. The end of the duct leading into the dairy is provided with a valve, *o*, by means of which the passage of air into the dairy is controlled. During the winter months the temperature of the earth adjacent to the duct is higher than that of the air by which the dairy is surrounded, for which reason the air which enters the duct absorbs heat from the earth, becomes rarefied, and, passing into the dairy, rises and escapes at its ceiling, the effect being to insure a continuous circulation of air through the room, and also to raise the temperature of the air within the room. The amount of warm air thus introduced into the dairy can be regulated at will by means of the valve *o*.

In case the air in the lower part of the dairy-room be warmed by the introduction of milk into the milk-cans E E, such rarefied air will ascend and escape at the ceiling of the room, thereby drawing air through the duct A to take the place of that which has been removed from the lower part of the room; and it is apparent that if the air outside the building be warmer than the earth adjacent to the duct, it (the air) will be cooled in its passage through the duct, the result being that the temperature of the air within the dairy-room is caused to approximate closely to that of the earth which surrounds the duct.

Thus it will be seen that the operation of my construction is to maintain, at all seasons of the year, a free circulation of air in an upward direction through the dairy-room, and that the temperature of the air within this room is modified by and made to approximate to the temperature of the earth which surrounds the duct.

The ice-house is provided with suitable doors, situated in positions best adapted to the introduction and removal of ice, and the door with windows for lighting and ventilating purposes.

The entrance to the dairy is protected by a vestibule having double doors.

What I claim is—

1. In combination with an inclosed room, and as a means for introducing air into the same, the downwardly-inclined subterranean air-duct H, substantially as set forth.

2. In combination with an inclosed room, and as a means for introducing air into the same, the downwardly-inclined subterranean air-duct H and a valve for regulating the movement of the air-current, substantially as set forth.

3. In a dairy, the combination of the water-bath, an ice-house placed contiguous thereto, and the water-pipe D, a portion of the pipe being located in the ice-house, and in a plane higher than the plane of a portion of the pipe in the water-bath, substantially as set forth.

4. In a dairy, the combination, with the bath *a*, of the reservoir *e* and pipes *e′ e″ g*, substantially as set forth.

5. The combination of the tank G, having an aperture, *i*, the ice-house B, provided with an inclined floor, the pipes *f* and *g*, and the bath *a*, substantially as set forth.

6. The combination, with the bath *a*, of the tank G and pipes *f*, *g*, D, and *h*, substantially as set forth.

7. The combination of the bath *a*, tank G, having an aperture, *i*, the ice-house B, having an inclined floor, and the pipes *f*, *g*, and D, substantially as set forth.

In testimony that I claim the foregoing I have hereunto set my hand this 3d day of March, 1879.

JOHN WILKINSON.

Witnesses:

M. M. TOWNE,

ARCHIBALD DAVIDSON.